United States Patent
Momoda et al.

(10) Patent No.: US 7,794,828 B1
(45) Date of Patent: Sep. 14, 2010

(54) DIRECTIONAL AND AREAL THERMAL CONTROL COATING, USING ALIGNED METAL OXIDE MESOSTRUCTURES

(75) Inventors: Leslie A. Momoda, Los Angeles, CA (US); William Bavosa-Carter, Ventura, CA (US); Amanda C. Phelps, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1106 days.

(21) Appl. No.: 11/048,267

(22) Filed: Feb. 1, 2005

(51) Int. Cl.
    *B32B 5/18* (2006.01)
(52) U.S. Cl. ............. 428/307.7; 428/307.3; 428/315.5; 428/315.7; 428/131
(58) Field of Classification Search ............. 428/318.6, 428/319.1, 305.5, 307.3, 307.7, 315.5, 315.7, 428/131
    See application file for complete search history.

(56) References Cited

U.S. PATENT DOCUMENTS

| | | | |
|---|---|---|---|
| 6,592,764 B1 * | 7/2003 | Stucky et al. | 210/660 |
| 6,752,868 B2 | 6/2004 | Lewis, III et al. | |
| 6,919,119 B2 * | 7/2005 | Kalkan et al. | 428/119 |
| 6,924,921 B2 | 8/2005 | Lewis, III et al. | |
| 7,001,669 B2 * | 2/2006 | Lu et al. | 428/613 |
| 7,045,205 B1 * | 5/2006 | Sager | 428/304.4 |
| 7,594,982 B1 * | 9/2009 | Roscheisen et al. | 204/284 |

OTHER PUBLICATIONS

Machine Translation of JP 2003-109490, Miyata, Hirokatsu, Apr. 11, 2003.*

Lu, Yunfeng, et al., Continuous Formation of Supported Cubic and Hexagonal Mesoporous Films by Sol-Gel Dip-Coating, Letters to Nature, Sep. 25, 1997, pp. 364-368, vol. 389, Nature © Macmillan Publishers Ltd. 1997.
Brinker, C. Jeffrey, et al., Evaporation-Induced Self-Assembly: Nanostructures Made Easy, Research News, Advanced Materials, 1999, pp. 579-585, 11, No. 7, Wiley-VCH Verlag GmbH, D-69469 Weinheim, 1999.
Costescu, R. M., et al., Ultra-Low Thermal Conductivity in $W/Al_2O_3$ Nanolaminates, Reports, Science, Feb. 13, 2004, pp. 989-990, vol. 303.
Krister Holmberg, *Surfactant-templated nanomaterials synthesis*, Journal of Colloid and Interface Science; Apr. 23, 2004; pp. 355-364; vol. 274; Department of Applied Surface Chemistry, Chalmers University of Technology, Goteborg, Sweden.
J.P. Hoogenboom et al., *Template-Induced Growth of Close-Packed and Non-Close-Packed Colloidal Crystals during Solvent Evaporation*; Nano Letters, Published on Web Jan. 27, 2004; vol. 4, No. 2; 205-208.
L. Rockford et al., *Propagation of Nanopatterned Substrate Templated Ordering of Block Copolymers in Thick Films*; Macromolecules; vol. 34, No. 5 Jan. 25, 2001; pp. 1487-1492.
Chongjun Jin et al., *Template-Assisted Growth of Nominally Cubic (100)-Oriented Three-Dimensional Crack-Free Photonic Crystals*; Nano Letters; Published on Web Nov. 10, 2005, vol. 5, No. 12, pp. 2646-2650.

* cited by examiner

*Primary Examiner*—Hai Vo
(74) *Attorney, Agent, or Firm*—Christie, Parker, Hale (57) ABSTRACT

A thermal control coating derived from a sol-gel process includes a plurality of self-assembled mesopores (and/or mesotubes). The plurality of self-assembled mesopores are aligned with respect to a substrate and/or filled with a conductive material. The aligned and/or filled pores are used to provide thermal control for the substrate having a thermal characteristic.

19 Claims, 8 Drawing Sheets

DIRECTIONAL AND AREAL THERMAL CONTROL COATING, USING ALIGNED METAL OXIDE MESOSTRUCTURES

FIELD OF THE INVENTION

The invention relates generally to the field of thermal control coatings and, more particularly, to ceramic thin films having self-assembled mesostructures for thermal controls.

BACKGROUND OF THE INVENTION

Thin thermal control coatings have many beneficial applications. For example, thin thermally conducting coatings can be used to transport heat along or through structural surfaces away from localized heat sources, such as exhaust ports or hypersonic leading edges on a military aircraft and missiles. These thermal control coatings, as opposed to structural thermal management systems like radiators or active thermal control systems like fluid cooling, would greatly enhance future military systems by reducing weight and complexity while improving manufacturability. Current thermal diffusion and protection coatings used for satellite antenna systems are extremely expensive, not very robust, and hard to process. Additionally, active cooling systems require additional mass, volume, and power further limiting system design and performance. It is therefore desirable to provide a thermal control coating that overcomes the shortcomings of the prior art while retaining their advantages.

In particular, it would be desirable to provide a more robust, inexpensive, easily processed thermal control coating onto a substrate and scaled to cover large areas, such as an exhaust port, a hypersonic leading edge, a satellite antenna, etc. In addition, it would be desirable to provide a thermal control coating that can be used to direct heat on a small localized scale, such as spreading heat away from a microelectronics circuit chip.

Moreover, good thermal conductors require high perfection/order on the sub-phonon scale. Currently this is achieved by vapor deposition but it is not easily scalable to large areas of coverage. Self-assembled coatings provide a high level of perfection/order on the sub-phonon scale while allowing large scale surface coverage. As such, it would be desirable to provide a thermal control coating that can be scalable to large areas.

SUMMARY OF THE INVENTION

The invention relates to systems and associated methods for providing a thin thermal control coating. For example, a thermal control coating according to the invention provides self-assembled mesopores (and/or mesotubes) that can be engineered for directional and tailorable thermal conductivity.

In addition, the coating comprised of self-assembled mesopores (and/or mesotubes) can be easily scaled to large areas.

One embodiment of the invention provides a method of depositing a thermal control coating to a substrate. The embodiment includes preparing a starting sol-gel solution; coating the prepared sol-gel solution onto the substrate having a thermal characteristic; polymerizing a plurality of self-assembled mesopores from the sol-gel solution coated onto the substrate; and controlling the thermal characteristic of the substrate by the plurality of polymerized metal oxide ceramics containing mesopores coated onto the substrate. The thermal characteristics of the substrate may include, for example, thermal conductivity, thermal stability, compatibility with the environment, or infrared (IR) signature.

The polymerizing of the plurality of self-assembled mesopores may include aligning the plurality of self-assembled mesopores with respect to the substrate. The thermal characteristic of the substrate may then be controlled by the plurality of aligned mesopores coated onto the substrate.

Aligning the plurality of self-assembled mesopores may include aligning the plurality of self-assembled mesopores perpendicular to the substrate and/or parallel to the substrate.

Polymerizing the plurality of self-assembled mesopores may in the alternative or further include filling the plurality of self-assembled mesopores with a predetermined conductive material. The thermal characteristic of the substrate may then be controlled by the plurality of filled mesopores coated onto the substrate.

A more complete understanding of the systems and methods for providing a directional and areal thermal control coating, using aligned metal oxide mesostructures will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

These and other features, aspects and advantages of the present invention will be more fully understood when considered with respect to the following detailed description, appended claims and accompanying drawings.

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The present invention is directed to ceramic thin films with self-assembled mesopores that can be engineered for directional and tailorable thermal conductivity. Tailored mesoscale pores are engineered to self assemble from solution using surfactants and the sol-gel ceramic thin film processing technique and are further extended to include filling of the pores with a good thermal conductor (e.g. metal, graphite, AlN) or left unfilled to produce a high range (2 orders of magnitude) of achievable thermal conductivity within the engineered thin film. Moreover, the direction of the thermal conduction can be controlled through the proper choice of surfactant chemistry and substrate treatments.

In the context of the present application, the self-assembly process (or self-assembly) is referred to as the spontaneous organization of materials through noncovalent interactions (e.g., through hydrogen bonding, Van der Waals forces, electrostatic forces, $\pi$-$\pi$ interactions, etc.) with no external intervention. Self-assembly typically employs asymmetric molecules that are pre-programmed to organize into well-defined supramolecular assemblies. These molecules can include amphiphilic surfactant molecules or polymers composed of hydrophobic and hydrophilic parts.

Figure 1:
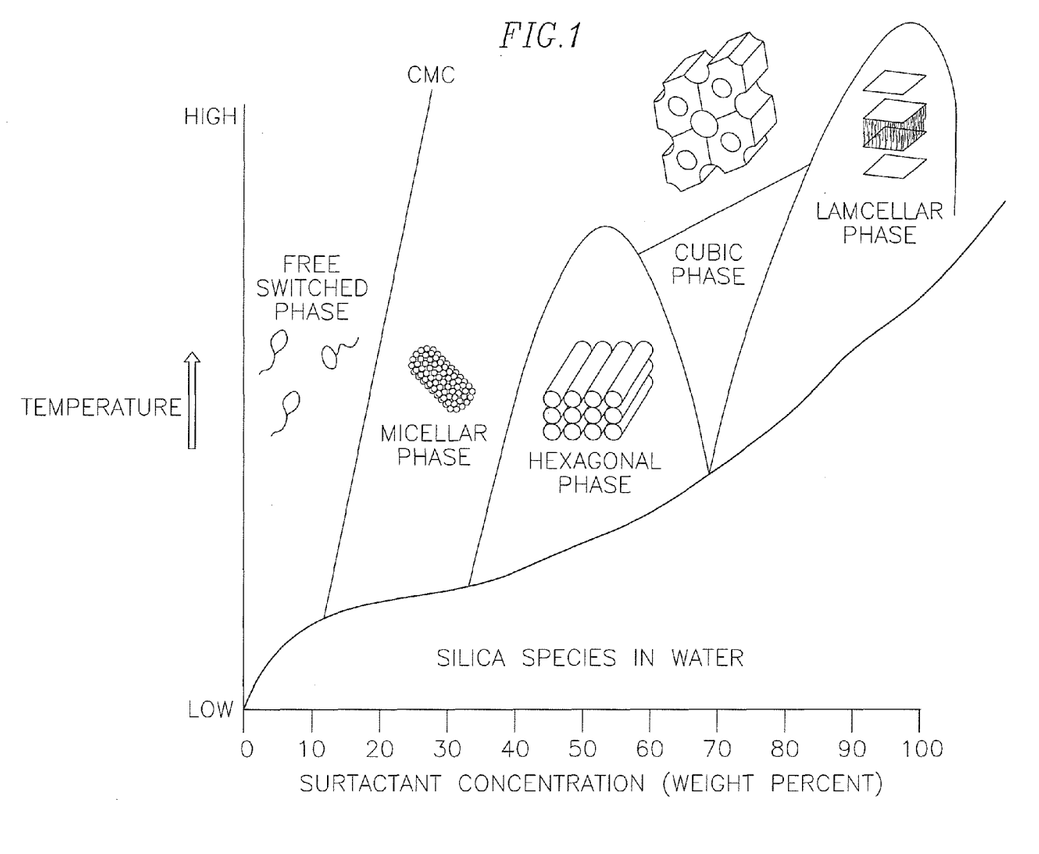
FIG. 1 is a phase diagram of a surfactant (e.g.—block copolymers) in a solvent (e.g., water) which can produce self-assembled molecules as shown in Brinker, C. J.; Lu, Y.; Sellinger, A.; Fan, H. *Adv. Mater.* 1999, 11, 579-585, the entire content of which is incorporated herein by reference.

Referring now to FIG. 1, in aqueous solution above the critical micelle concentration (CMC), surfactants assemble from free surfactants (in the free surfactant phase) into lyotropic liquid crystalline phases such as spherical or cylindrical structures (in the micellar phase) that maintain the hydrophilic parts of the surfactant in contact with water while shielding the hydrophobic parts within the micellar interior. Further increases in surfactant concentration result in the self-organization of micelles into periodic hexagonal, cubic, or lamellar phases. The surfactant self-assembly conducted in aqueous solutions of soluble silica species results in spontaneous coassembly of silica-surfactant phases (mesophases). Surfactant removal creates periodic mesoporous solids, essentially silica fossils of the liquid-crystalline assembly.

Figure 2:
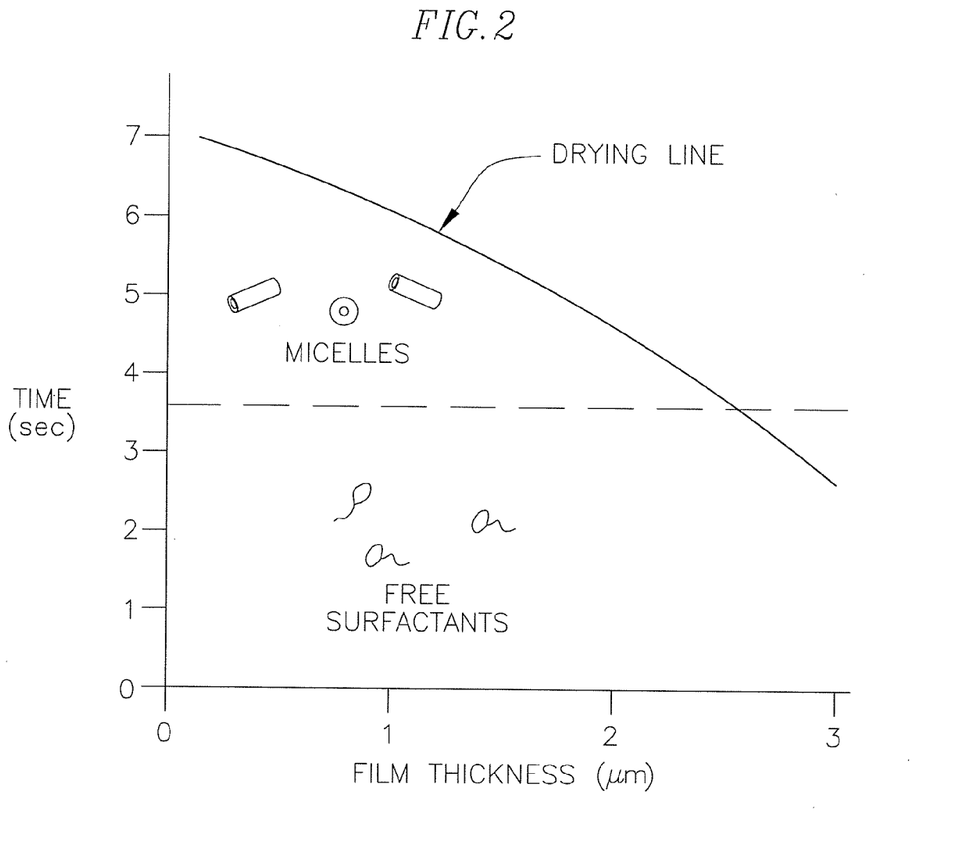
FIG. 2 is a film evaporation profile diagram of a metal oxide (e.g. silica) solution which self-assembles into mesostructures as shown in Lu, Y.; Ganguli, R.; Drewien, C. A.; Anderson, M. T.; Brinker, C. J.; Gong, W.; Guo, Y.; Soyez, H.; Dunn, B.; Huang, M. H.; Zink, J. I. *Nature* 1997, 389, 364-368, the entire content of which is incorporated herein by reference.

Referring now to FIG. 2 and pursuant to aspects of the invention, a homogeneous solution of soluble silica or other metal oxide and surfactant can be prepared in ethanol/water solvent with the concentration of the silica being much less than the CMC. The preferential evaporation of ethanol (over water) then concentrates the depositing film in water with nonvolatile surfactant and silica species. The progressively increasing surfactant concentration drives self-assembly of silica-surfactant micelles and their further organization into liquid-crystalline mesophases. The result is rapid formation of thin film mesophases that are highly oriented with respect to the substrate surface.

Figure 3:
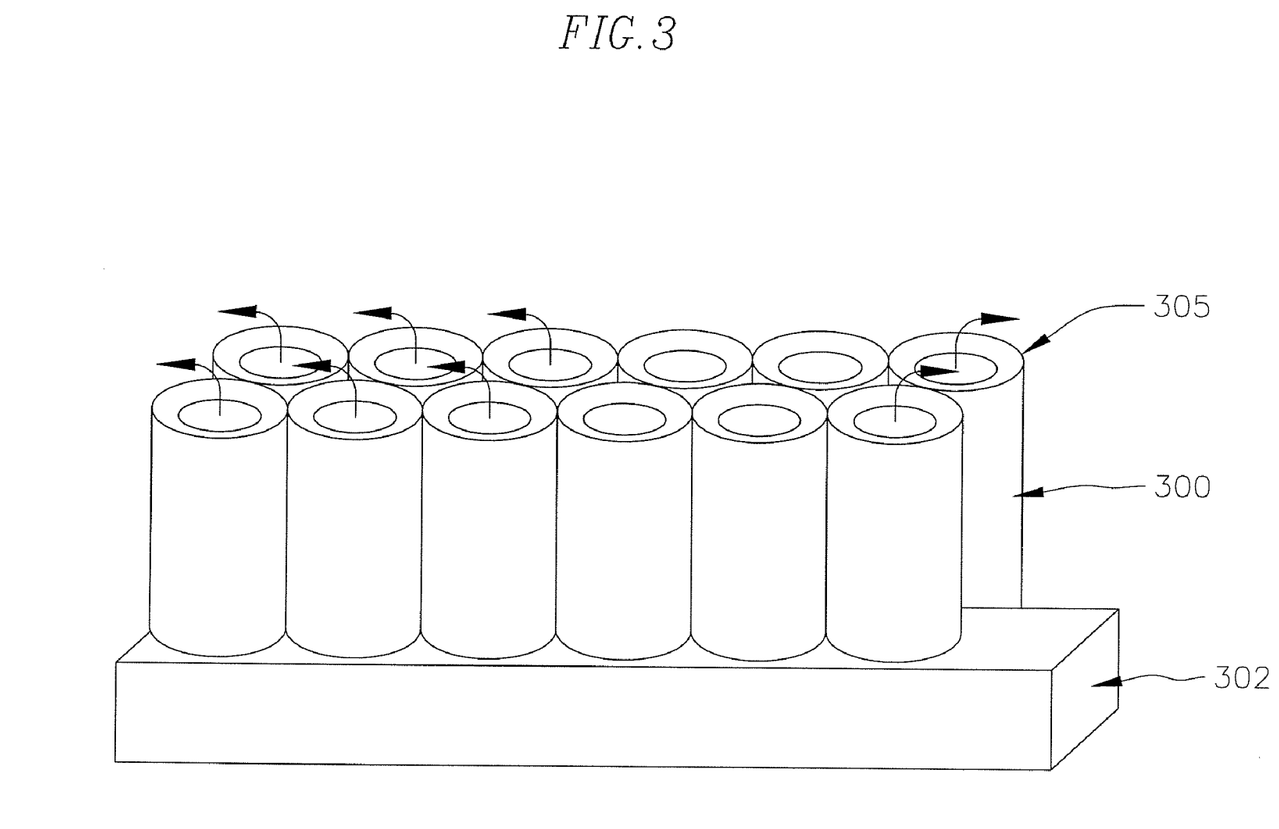
FIG. 3 is a schematic diagram of a ceramic thin film containing aligned mesopores.

FIG. 3 is a schematic diagram of ceramic thin film (e.g., silica thin film) 300 coated onto substrate 302 that uses self-assembled mesopores (e.g., mesotubes) for lightweight thermal control pursuant to aspects of the present invention. As is shown in FIG. 3, ceramic thin film 300 is an ordered porous ceramic thin film that includes pores 305 aligned perpendicular to substrate 302.

Figure 4:
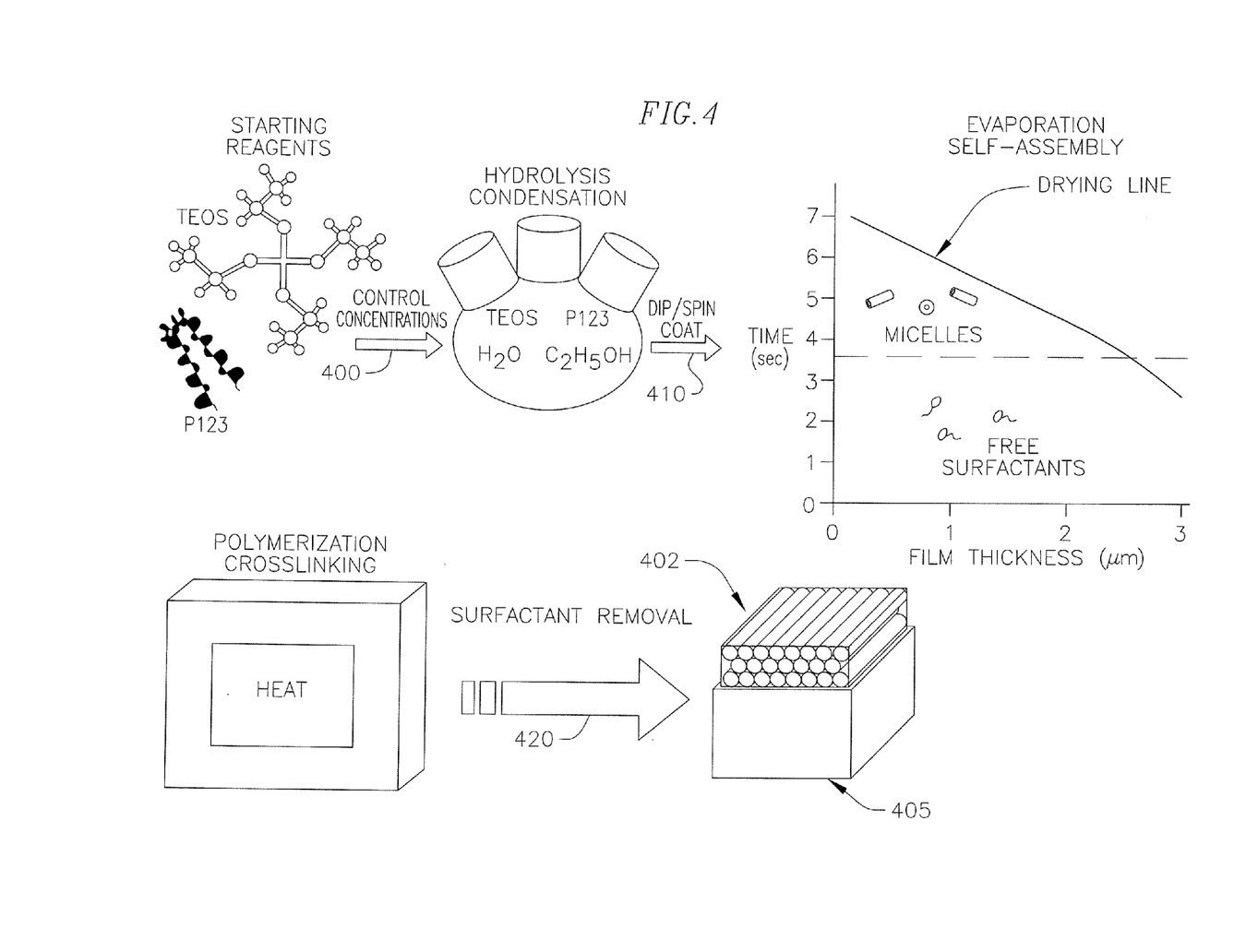
FIG. 4 is a schematic diagram of the formation of a mesoporous ceramic thin film on a substrate.

Referring now to FIG. 4, an ordered porous ceramic thin film 402 in accordance with one embodiment of the present invention is formed using a solution derived sol-gel process and a surfactant or block co-polymer template that defines the order in the structure. The ratio of the surfactant-to-water and sol-gel metal organic precursors is carefully controlled (400) to produce a thin film tubular template structure upon solvent evaporation from a solution which has been dip coated, spray coated or spin coated (410) onto substrate 405. The subsequent structure is then fired to remove the surfactant (420) leaving behind an ordered, porous structure of controlled dimension. In the case of FIG. 4, the left behind ordered ceramic thin film 402 includes pores that are shown to be parallel to substrate 405.

Further, referring now back to FIG. 3, within templated ceramic structure 300, which is thermally insulating, regional conductivity control and directionality can be introduced in accordance with a further embodiment of the invention. Regional conductivity control is achieved through the intentional filling or absence of filling of mesopores 305 with thermally conductive materials such as metals, graphite, $Al_2O_3$ or AlN. Areas with filled pores 305 should exhibit high thermal conductivity while those left unfilled should exhibit good thermal insulation. Pore filling can be achieved through thermal diffusion of metals, solution impregnation followed by treatment in a reducing atmosphere, electroplating or solvent extraction combined with capillary action.

Directionality of thermal flow can be achieved through the orientation of pores 305 perpendicular or parallel to the substrate surface (e.g., see FIG. 4). Pore alignment parallel to the substrate surface can be achieved by preferential drawing of the sol-gel solution. Perpendicular alignment of the pores with respect to the substrate can be achieved by surface templating, controlled agglomeration or surface tension control techniques. That is, the pores of a ceramic thin film can be aligned using surface tension, a neutralized substrate, a templated substrate (fabricating inorganic films on templated organic surfaces), and/or controlled agglomeration. In addition, it is possible to macroscopically orient the pores using an applied magnetic field, electric field, and/or shear field.

In particular, ceramic-surface liquid crystals (e.g., silicate-surface liquid crystals) can be aligned on the basis of the collective diamagnetic susceptibilities of the molecular components of the material. Appreciable control over the alignment direction for both hexagonal and lamellar morphologies can be achieved by tuning the composition of the ceramic or silicate-surfactant liquid crystal phase, especially the nature of the amphiphilic or organic cosolvent species. For example, it is possible to retain long-range alignment of hexagonal silicate-surfactant mesophases even after the inorganic component of the liquid crystal is polymerized by acidic or acidic-thermal treatment. Furthermore, the organic components of the polymerized composite can be removed by calcination without disruption of the macroscopic orientational order of the initial magnetic field-aligned material. The resulting bulk hexagonal mesoporous solid exhibits long-range orientational ordering of the pores, which are aligned on average along the direction of the applied magnetic field.

As discussed above, ordered (e.g., hexagonal) silicate-surfactant liquid crystals can be prepared by mixing a weighted percentage of an aqueous solution to yield a predetermined overall molar ratio. Upon mixing, the sample should immediately phase separate into a viscous silicate-surfactant-rich liquid crystalline phase and an aqueous-rich phase. The silicate-surfactant liquid crystals may then be oriented by an external force or field such as a magnetic field and then heated above their respective anisotropic-to-isotropic phase transition temperatures (depending on the composition), followed by slow cooling in the external field.

The high viscoelasticity of oriented silicate-surfactant liquid crystals at room temperature allows them to be removed from the magnetic field for extended periods of time (several months) without loss of orientational order. Moreover, field-induced alignment can be preserved during subsequent polymerization of the silicate component to form a mesostructured composite solid with a rigid silica framework that retains the orientational order of the precursor liquid crystal.

Polymerization of the silicate species can be induced by at least two different methods. In a first method, the aqueous-rich phase is separated from the silicate-surfactant-rich phase, and the latter is exposed to concentrated HCl vapor in a closed container for a period of a predetermined number of days at room temperature. After removal from the acid vapor, samples can be dried under mild vacuum to produce free-standing solid monoliths. In a second method, aqueous HBr is added to the two-phase mixture until a predetermined pH of the aqueous phase is reached. This solution is kept at a predetermined temperature level for a predetermined number of days; the aqueous phase is then decanted, and the sample is dried under mild vacuum at room temperature. Further thermal treatment in water at another predetermined temperature level could be used to increase the extent of polymerization of the silica frame-work and improve the mesoscopic order of the material after calcination. The first method may produce samples with better macroscopic alignment (that is, a larger fraction of oriented material), whereas the second method may result in samples with higher mesoscopic order, but poorer macroscopic alignment.

To produce a mesoporous solid, the surfactant species must be removed, which can be achieved by calcinations. Aligned monoliths of the silica-surfactant composite can be calcined in oxygen to produce oriented mesophorous silica.

In general, the silica-surfactant liquid crystals may be oriented through employment of a magnetic or electric field, a chemical gradient, surface tension or steric control. For example, self-assembled processing, followed by inorganic (or organic) polymerization offers a wide range of possibilities for the formation of hierarchically structured materials. Beside using magnetic fields, the alignment of anisotropic liquid crystalline materials can be induced by the application of a variety of other suitable external fields (or forces), including shear fields, electric fields, and etc., and/or by direct contact with surfaces (epitaxial alignment). Moreover, within the methodology of magnetic field alignment, the resultant orientational ordering can be controlled by the manipulation of the mesophase composition on the basis of the molecular diamagnetic susceptibilities of the constituent species. In addition, depending on the choices of surfactant and cosolvent molecules, hexagonal composites can be oriented such that the domain axes are aligned either parallel to the applied field or perpendicular to it; similar results can be obtained for lamellar phases.

The fact that these oriented materials are prepared with a liquid crystalline intermediate offers flexibility in controlling the shape of the composite or mesoporous solid products. As discussed above, the silicate-surfactant liquid crystals are viscoelastic and thus retain orientational alignment on time scales of months or longer. When the materials are heated above their anisotropic-to-isotropic transition temperature, however, their viscoelasticity is substantially reduced, and they can thus be processed into bulk structures and films with different macroscopic shapes by selection of the desired size and form of the reaction vessel.

Important possibilities also exist for mesostructural variability in these systems. For example, under alkaline conditions, the pore size can be controlled over a certain range (e.g., 20 to 150 Å) by variations in the surfactant chain length and the quantity of the cosolvent. Such strategies can also be applied to oriented samples. Besides the hexagonal, examples of other potentially alignable silicate-surfactant structures include the 1D lamellar phase, the 2D centered rectangular phase, and the 3D hexagonal phase. More generally, any inorganic-organic composite with a noncubic structure that can be produced through a liquid crystalline intermediate should be alignable through appropriate choices of substrate, composition, temperature, and/or applied field.

Figure 5:
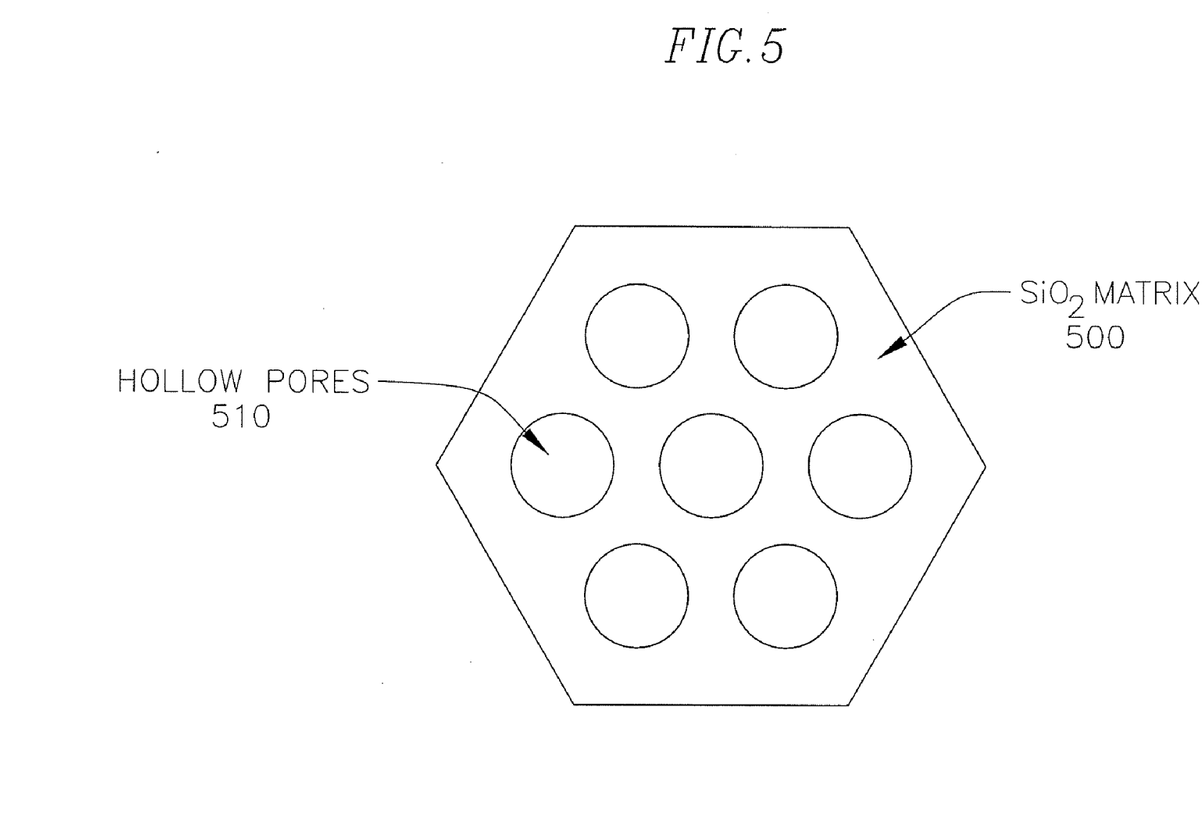
FIG. 5 is a schematic diagram of a mesoporous ceramic thin film matrix with a two dimensional hexagonal pore architecture.

As also discussed above, the thermal control quality of the aligned (or non-aligned) pores of a ceramic thin film can be further enhanced by filling them with a conducting material. The pores can be filled using fast diffusion (e.g., thermal diffusion), impregnation with subsequent reduction, combined solvent extraction with capillary action, functionalization (e.g., using a functionalized silica mesoporous structure that is chemically modified to contain charged species to allow for desired materials to be attracted to the inside of pores) and/or vapor infiltration with subsequent pyrolysis. In particular, various pore filling possibilities and/or details are known to those skilled in the art, and the invention is not thereby limited. For example, referring now to FIG. 5, assuming that ceramic or silica matrix 500 is a dense structure, it is known to those skilled in the art that ions can be more favorably filled in hollow pores 510 as opposed to disrupting the silica matrix 500.

Figure 6:
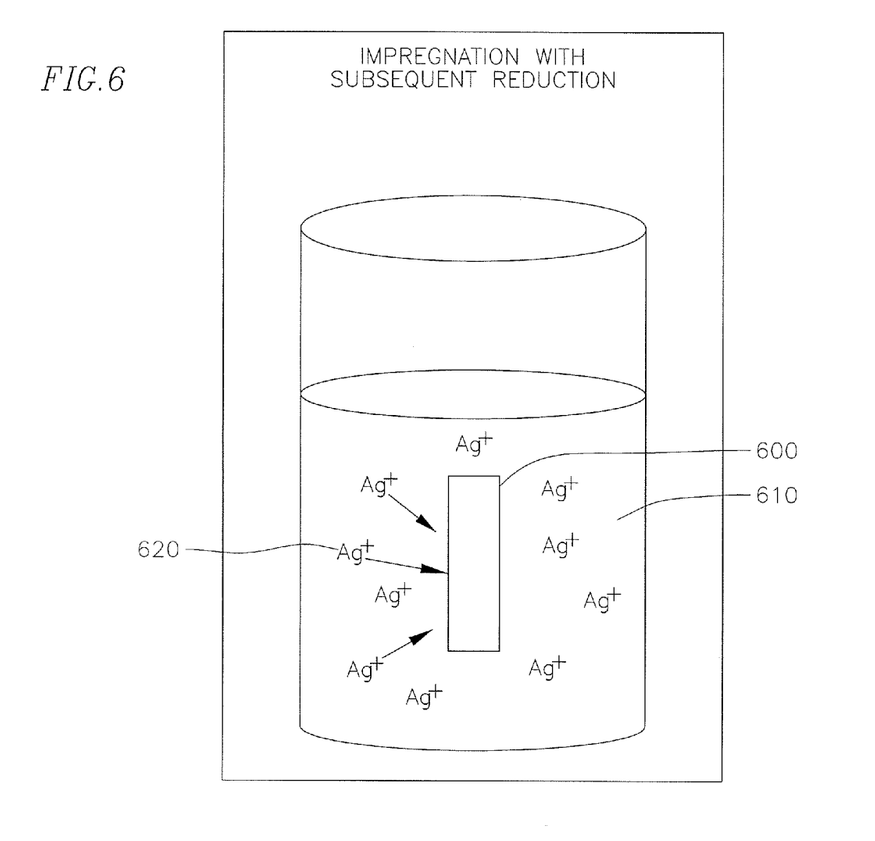
FIG. 6 is a schematic diagram illustrating impregnation filling of a conduction material into pores of a mesoporous ceramic thin film.

More specifically, referring now to FIG. 6, the pores may be filled using impregnation filling in which entire thin film 600 is submerged into ionic solution 610 and ions (e.g., $Ag^+$) 620 are allowed to diffuse into the hollow pores of thin film 600 (over time). In this situation, the ions 620 do fill the pores since the ions 620 have direct access to them and no energy is supplied to the system.

Figure 7:
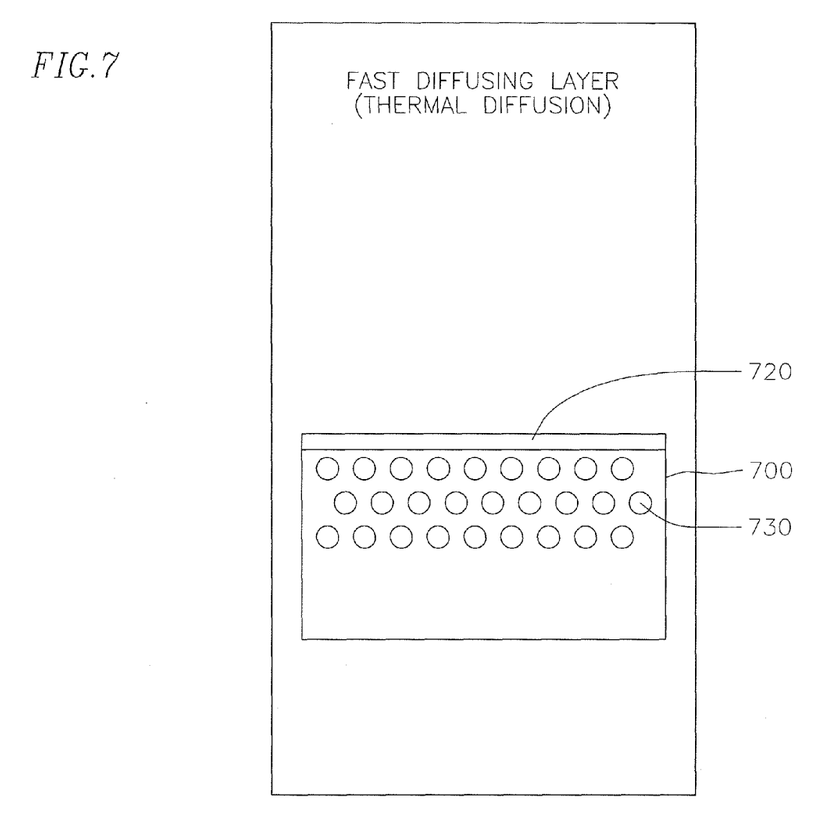
FIG. 7 is a schematic diagram illustrating filling of a conduction material into pores of a mesoporous ceramic thin film using fast diffusing ions or molecules to form the conductive core.

Alternatively and referring now to FIG. 7, the pores may be filled using a fast silica diffuser. In this case, the filling of thin film 700 takes advantage of a pre-selected temperature and the small size of ion 720 to diffuse into thin film 700. Here it is much more likely that ion 720 has disrupted the ceramic or silica matrix of thin film 700 since ion layer 720 was placed directly on top of thin film 700 and ion 720 conceivably would diffuse through the matrix in order to get to pores 730.

In general according to the foregoing, the present invention provides well-aligned, thin film thermal control systems methods that achieve perfection and crystallinity at the small length scale. In addition, certain systems and methods of the present inventions can be easily scaled to large areas.

Figure 8:
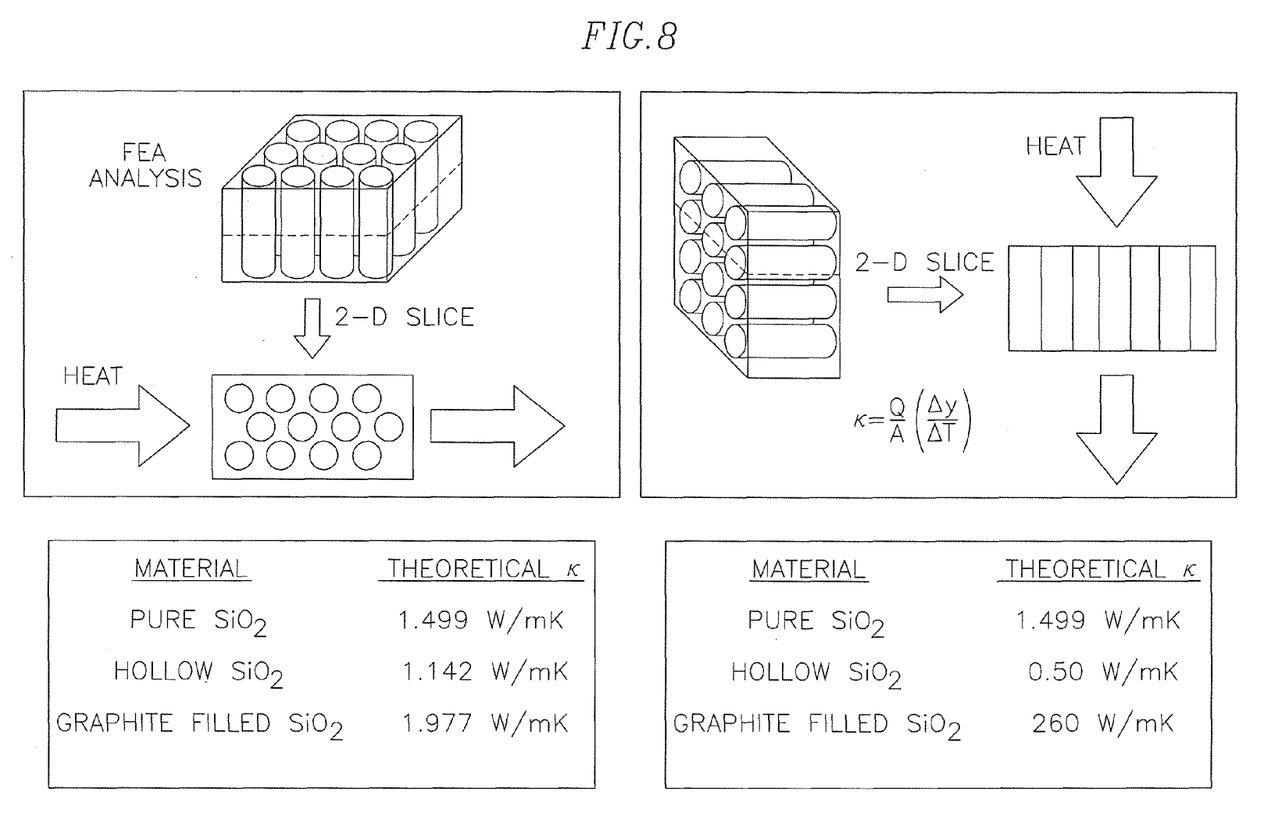
FIG. 8 is a diagram illustrating heat transport properties of aligned and/or filled ceramic thin film on a substrate. The heat transport properties were theoretically calculated.

FIG. 8 illustrates theoretical calculations made for a particular geometry of an embodiment of the present invention, with a silica matrix and polycrystalline graphite filling the pores. Finite element simulations of heat transport parallel and perpendicular to the pore direction were performed. The perpendicular case was simulated directly, with a simulation cell bounded on two sides by a heat source and a heat sink, mirror boundary conditions at top and bottom (i.e. heat flux across that boundary was not allowed) and infinite boundary conditions along the pore direction. The parallel case was approximated by a laminar geometry where the volume fractions in the two elements of the laminate matched the volume fractions of the hexagonal pore geometry. The parallel results were found to be identical to a simple rule of mixtures, as expected. Results are shown in FIG. 8 for $SiO_2$ matrix and polycrystalline graphite filled pores. As shown, the resulting anisotropy is greater than two orders of magnitude. Additionally, the high conductivity direction is dramatically superior to high thermal conductivity coatings available commercially, which most commonly reach only 1-3 W/mK.

A factor not included in the simulations (or calculations) of FIG. 8 is the effect of phonon scattering off defects at varying length scales. Nanoscale structures such as those found in typical mesoporous silica films, can have a profound effect on thermal conductivity as discussed in R. M. Costescu, D. G. Cahill, F. H. Fabreguette, Z. A. Sechrist, and S. M. George, "Ultra-low thermal conductivity in W/Al2O3 nanolaminates," Science 303, 989-990 (2004), the entire content of which is incorporated herein by reference. This enables these materials to have a significantly wider range of possible thermal conductivities than has been achievable. Small size, however, does not always translate to decreased thermal transport; highly aligned and highly harmonic bonding can greatly increase transport. For instance, the theoretical thermal conductivity of carbon nanotubes along the axis of the tube can be as high as 2980 W/mK, nearly three times higher than pitch-based graphite fibers. Defects can reduce this thermal conductivity considerably, but even high defect concentrations (either conformational or vacancy) still leave the material highly conductive (e.g. at 10% vacancy concentration, K=400 W/mK). The constrained nature of material formation within the pore encourages greater crystallinity and therefore improved transport properties. The resulting thermal conductivity should reflect a balance between nanoscale interface effects and enhanced crystallinity.

Embodiments of the present invention can be applied in many areas. In general, anywhere in which thermal insulation or thermal conduction are needed can use a thermal control coating of the present invention. Specifically, in a first embodiment of the present invention, a thermal control coating or thin film can have a thickness that is equal or less than about 100 microns thick for lateral heat spreading at small scales. In this thickness, the thermal control coating can be used for heat spreading and dissipation for microelectronics circuits and interconnects. The thin film conductivity material would be applied on top of such structures, and draw heat from where it is generated over a wider area of the substrate where it is more effectively dissipated.

In a second embodiment, a thermal control coating can have a thickness that is equal or greater than about 200 microns thick but less than or about 1000 microns thick, for lateral heat spreading at medium scales. Above this thickness, the thermal control coating can be used for spreading of thermal exhaust loads. For example, the coating is applied to an aircraft structure that may undergo transient or continuous heat flux from a high-intensity source such as an exhaust. The coating spreads the heat load over more of the structure, reducing both the maximum temperature of the structure and the overall thermal signature. The thermal control coating of the second embodiment can also be used in the protection from directed energy weapons such as lasers. A combination of diffuse scatter and highly directional heat spreading would minimize the absorption of thermal energy and spread what thermal load was absorbed over a larger area of the structure. The thermal control coating of the second embodiment can further be used in avionics and electronics package applications. By applying a heat spreading coating over an avionics board or electronics package, the heat generated by discrete components on those boards would be spread over the entire board. Hence, the cooling jacket or heat sink that is commonly used in those situations would become more efficient because more of the area of the jacket or sink is used. Moreover, the thermal control coating of the second embodiment can be used for thermal interfaces. By orienting the directional thermal conductivity perpendicular to the surface generating heat, these coatings could be used as high-temperature thermal interfaces. In this case, the thermal control coating should be cured in place between the two components to be interfaced. (Current interface materials are limited in conductivity; many are not compatible with >150° C.).

In a third embodiment, a thermal control coating or structure can have a thickness that is equal or greater than about 1 mm thick for heat management at macroscopic scales. In this thickness, the coating or structure can be used for heat routing from sources to sinks, with isolation and minimal heat loss to structures in between those two points. For example, taking heat generated at a wing leading edge and routing it into the fuel tank, which can have much higher thermal capacity.

While certain exemplary embodiments have been described in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. For example, a thermal coating having tubular pores has been illustrated, but it should be apparent that the inventive concepts described above would be equally applicable to thermal coatings having other pore shapes and/or structures. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A thermal controlled device comprising: a substrate having a thermal characteristic; and
    a plurality of self-assembled ceramic mesopores polymerized on the substrate, aligned to the substrate and filled with a conductive material; wherein the conductive material is a thermally conductive material and comprises aluminum nitride;
    wherein the plurality of polymerized, aligned, and filled ceramic mesopores control the thermal characteristic of the substrate and wherein the plurality of polymerized self-assembled ceramic mesopores form a layer having a thickness of 200-1000 μm.

2. The thermal controlled device of claim 1, wherein the plurality of self-assembled ceramic mesopores are perpendicularly aligned to the substrate.

3. The thermal controlled device of claim 2, wherein the substrate is a templated substrate for aligning the plurality of self-assembled ceramic mesopores perpendicularly to the substrate.

4. The thermal controlled device of claim 1, wherein the conductive material is diffused into the self-assembled ceramic mesopores.

5. The thermal controlled device of claim 1, wherein the plurality of self-assembled ceramic mesopores are self-assembled silica mesopores.

6. The thermal controlled device of claim 1, wherein the plurality of self-assembled ceramic mesopores are coated on the substrate by utilizing a sol-gel solution.

7. The thermal controlled device of claim 1, wherein the plurality of self-assembled ceramic mesopores comprise a plurality of through-holes.

8. The thermal controlled device of claim 1, wherein the plurality of self-assembled ceramic mesopores comprise a plurality of mesotubes, each of the mesotubes has an opening facing toward the substrate and another opening facing away from the substrate.

9. The thermal controlled device of claim 1, wherein the substrate is a templated substrate for aligning the plurality of self-assembled ceramic mesopores to the substrate, and wherein the conductive material is diffused into the self-assembled ceramic mesopores.

10. A thermal controlled device comprising:
    a substrate having a thermal characteristic; and a ceramic thin film on the substrate and comprising a plurality of self-assembled ceramic mesopores polymerized on the substrate, aligned to the substrate and filled with a conductive material;

wherein the ceramic thin film controls the thermal characteristic of the substrate and wherein the conductive material is comprises a thermally conductive material and comprises aluminum nitride.

11. The thermal controlled device of claim 10, wherein the plurality of self-assembled ceramic mesopores are perpendicularly aligned to the substrate.

12. The thermal controlled device of claim 11, wherein the substrate is a templated substrate for aligning the plurality of self-assembled ceramic mesopores to the substrate.

13. The thermal controlled device of claim 12, wherein the conductive material is diffused into the self-assembled ceramic mesopores.

14. The thermal controlled device of claim 10, wherein the substrate is a templated substrate for aligning the plurality of self-assembled ceramic mesopores to the substrate, and wherein the conductive material is diffused into the self-assembled ceramic mesopores.

15. The thermal controlled device of claim 10, wherein the plurality of self-assembled ceramic mesopores are self-assembled silica mesopores.

16. The thermal controlled device of claim 10, wherein the plurality of self-assembled ceramic mesopores are coated on the substrate by utilizing a sol-gel solution.

17. The thermal controlled device of claim 10, wherein the plurality of self-assembled ceramic mesopores comprise a plurality of through-holes.

18. The thermal controlled device of claim 10, wherein the plurality of self-assembled ceramic mesopores comprise a plurality of mesotubes, each of the mesotubes has an opening facing toward the substrate and another opening facing away from the substrate.

19. A thermal controlled device comprising:

a substrate having a thermal characteristic; and a plurality of self-assembled ceramic mesopores polymerized on the substrate, aligned to the substrate and filled with a conductive material; wherein the conductive material is a thermally conductive material and comprises aluminum nitride;

wherein the plurality of polymerized, aligned, and filled ceramic mesopores control the thermal characteristic of the substrate and wherein the plurality of polymerized self-assembled ceramic mesopores form a layer having a thickness of greater than or equal to 1 mm.

* * * * *